United States Patent
Kottapalli

(10) Patent No.: US 11,190,416 B2
(45) Date of Patent: *Nov. 30, 2021

(54) MANIFEST FILES-BASED PROVISIONING OF PHYSICAL HOSTS TO CLUSTERS IN HYPERCONVERGED INFRASTRUCTURES

(71) Applicant: VMWARE, INC., Palo Alto, CA (US)

(72) Inventor: Ravi Kumar Reddy Kottapalli, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/990,004

(22) Filed: Aug. 11, 2020

(65) Prior Publication Data
US 2020/0374203 A1 Nov. 26, 2020

Related U.S. Application Data

(63) Continuation-in-part of application No. 16/372,424, filed on Apr. 2, 2019, now Pat. No. 10,868,736.

(30) Foreign Application Priority Data

Jan. 22, 2019 (IN) .............................. 201941002591
Jun. 1, 2020 (IN) .............................. 202043022936

(51) Int. Cl.
*H04L 12/24* (2006.01)
*G06F 9/455* (2018.01)

(52) U.S. Cl.
CPC ...... *H04L 41/5054* (2013.01); *G06F 9/45558* (2013.01); *H04L 41/0806* (2013.01); *H04L 41/0893* (2013.01); *H04L 41/5022* (2013.01); *G06F 2009/45595* (2013.01)

(58) Field of Classification Search
CPC ............ H04L 41/5054; H04L 41/0806; H04L 41/0893; H04L 41/5022; G06F 9/45558; G06F 2009/45595
See application file for complete search history.

(56) References Cited

U.S. PATENT DOCUMENTS

| | | | |
|---|---|---|---|
| 7,609,651 B1* | 10/2009 | McBride | G06F 3/0632 370/252 |
| 9,935,830 B1* | 4/2018 | Mahapatra | H04L 41/0816 |
| 2019/0044806 A1* | 2/2019 | Sedayao | H04L 43/04 |

* cited by examiner

*Primary Examiner* — Viet D Vu

(57) ABSTRACT

In one example, a computer implemented method may include dynamically generating a manifest file for a cluster in an hyperconverged infrastructure. The manifest file may include metadata associated with the cluster. Further, the method may include determining one or more physical hosts in a host pool that are compatible with the cluster using the manifest file and generating a cluster-to-physical host mapping table by mapping the cluster to the determined one or more physical hosts that are compatible with the cluster. Furthermore, the method may include provisioning the one or more physical hosts to the cluster using the cluster-to-physical host mapping table in response to detecting a trigger.

18 Claims, 3 Drawing Sheets

MANIFEST FILES-BASED PROVISIONING OF PHYSICAL HOSTS TO CLUSTERS IN HYPERCONVERGED INFRASTRUCTURES

CROSS-REFERENCES TO RELATED APPLICATIONS

This application is a Continuation-in-part of patent no. 10868736 entitled "PROVISIONING: DEPROVISIONING PHYSICAL HOSTS BASED ON A DYNAMICALLY CREATED MANIFEST FILE FOR CLUSTERS IN A HYPERCONVERGED INFRASTRUCTURE", filed on Apr. 2, 2019, which claims the benefit under 35 U.S.C. 119(a)-(d) to Indian Application number 201941002591 entitled "PROVISIONING/DEPROVISIONING PHYSICAL HOSTS BASED ON A DYNAMICALLY CREATED MANIFEST FILE FOR CLUSTERS IN A HYPERCONVERGED INFRASTRUCTURE" filed on Jan. 22, 2019, and Indian Application number 202043022936 entitled "MANIFEST FILES-BASED PROVISIONING OF PHYSICAL HOSTS TO CLUSTERS IN HYPERCONVERGED INFRASTRUCTURES" filed on Jun. 11, 2020, by VMware, Inc., which is herein incorporated in its entirety by reference for all purposes.

TECHNICAL FIELD

The present disclosure relates to hyperconverged infrastructures, and more particularly to methods, techniques, and systems for provisioning a physical host to a cluster in a hyperconverged infrastructure based on a dynamically generated manifest file.

BACKGROUND

Hyper-converged infrastructure (HCI) is a type of virtual computing platform that converges compute, networking, virtualization, and storage into a single software-defined architecture. For instance, a single software application can interact with each component of hardware and software as well as an underlying operating system. Hyper-converged infrastructures provide enterprises and other organizations with modular and expandable compute, storage, and network resources as well as system backup and recovery. In the hyper-converged infrastructure, compute, storage, and network resources are brought together using preconfigured and integrated hardware. In hyper-converged infrastructures, multiple physical hosts can be clustered together to create clusters and/or workload domains of shared compute and storage resources. Further, physical hosts in a host pool may be provisioned to the clusters based on a user request or resource utilization of the clusters, for instance.

BRIEF DESCRIPTION OF THE DRAWINGS

Examples are described in the following detailed description and in reference to the drawings, in which.

DETAILED DESCRIPTION

Figure 1:
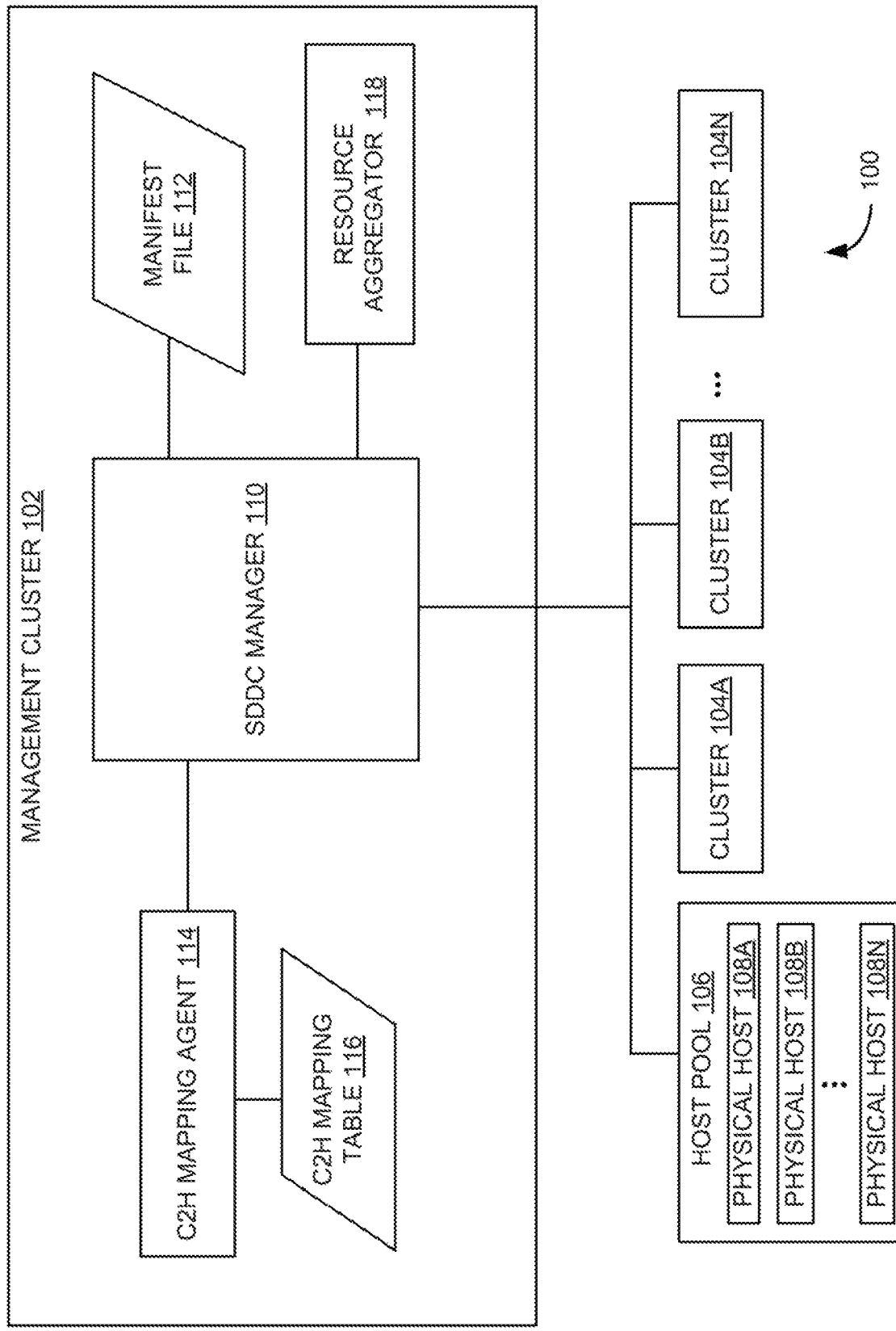
FIG. 1 is a block diagram of an example hyperconverged infrastructure, including an SDDC manager to provision one or more physical hosts to a cluster based on a dynamically generated manifest file.

Embodiments described herein may provide an enhanced computer-based and network-based method, technique, and system for provisioning a physical host to a cluster in a hyperconverged infrastructure based on a dynamically generated manifest file. The term "hyper-converged infrastructure" may refer to a type of virtual computing platform that converges compute, networking, virtualization, and storage into a single software-defined architecture. The hyperconverged infrastructure may include virtualized computing (e.g., a hypervisor), a virtual storage area network (vSAN) (e.g., software-defined storage), and virtualized networking (e.g., software-defined networking). For example, Vmware® cloud foundation (VCF) may be a hybrid cloud platform for managing virtual machines and orchestrating containers, built on a full stack hyperconverged infrastructure technology.

Such hyperconverged infrastructures may include multiple workload domains. The workload domains may include different combinations of servers (i.e., physical hosts) and network equipment which can be set up with varying levels of hardware redundancy and varying quality of components. A workload domain may represent a logical unit that groups physical hosts (e.g., enterprise-class, type-1 hypervisor (ESXi) hosts) managed by a server instance (e.g., vCenter server) with specific characteristics according to software defined data center (SDDC) polices. Thus, the workload domain may include multiple clusters of physical hosts. The cluster may be a collection of resources (e.g., physical hosts) that collectively provide scalable services to end users and to their applications while maintaining a consistent, uniform, and single system view of the cluster services. Each node may be a single entity machine or server having compute, storage, and/or network capacity. Example cluster may be a stretched cluster, a multi-availability zone (AZ) cluster, a metro cluster, or a high availability (HA) cluster that crosses multiple areas within a local area network (LAN), a wide area network (WAN), or the like. By design, the cluster may provide a single point of control for cluster administrators and at the same time, the cluster may facilitate addition, removal, or replacement of individual resources without significantly affecting the services provided by the hyperconverged infrastructure.

In order to provision a physical host to a cluster, create a cluster, or create a workload domain, the physical host may have to be initially added to a host pool in the hyperconverged infrastructure (e.g., VCF). A process of adding the physical host to the host pool may be referred as host commission. Further, the physical host to be commissioned may have to meet predefined criteria. Example predefined criteria may include the physical host to be vSAN compliant and certified based on a hardware compatibility guide, a hardware health status to be healthy without any errors, and the like. Upon successful commission of the physical host, the physical host may be maintained by the hyperconverged infrastructure, referred to as the host pool or host free pool. Further, the physical host in the host pool may be added to the cluster based on a user request, resource utilization of the cluster, or the like.

In some examples, when a user desires to add a physical host of the host pool to a cluster, a significant number of available physical hosts that are in the host pool may be presented. In this example, when the user selects a physical host and triggers to provision the physical host to the cluster, provisioning of the physical host to the cluster may fail because of various reasons such as vSAN incompatibilities, or the like, especially in one to many workload domains scenario. Example one to many workload domains may be a software defined data center (SDDC) having a different set of SDDC managers (e.g., NSXT™ manager) managing different set of workload domains based on its version support. In other words, in the one to many workload domains, a group of workload domains may be managed by a supported NSXT manager, for instance.

For example, consider two workload domain groups (e.g., a first workload domain group and a second workload domain group) in a hyperconverged infrastructure. The first workload domain group may support an enterprise-class type-1 hypervisor (ESXi) version of X and the second workload domain group may support ESXi version of Y. In this example, the user may have commissioned 100 ESXi hosts, where some ESXi hosts may support X version, other ESXi hosts may support Y version, and all the 100 ESXi hosts may be placed in the host pool in the VCF system. Further, when the cluster X in the first workload domain group is to be expanded, the expansion operation may be successful if the user selects an ESXi host that supports the ESXi version X, else the operation may fail. Thus, selecting the physical host that is suitable to expand the cluster from the host pool may be challenging. In this example, the ESXi version is considered to determine the physical host compatible to the cluster X. However, there can be multiple other parameters, such as vSAN compatibilities, network interface card (NIC) compatibilities, and the like, to determine a compatible physical host.

Thus, existing hyperconverged infrastructures may require manual provisioning of physical hosts in the host pool to the clusters based on cluster type and/or workload requirements in the hyperconverged infrastructure. For example, a user, such as an information technology (IT) administrator, may provision physical hosts manually based on a cluster type and/or workload priority requirement. Further, random selection of the physical host to provision to a cluster may result in a failure, for instance, due to version incompatibilities. For example, upon failure to provision the physical host to the cluster, global support services (GSS) may have to be employed to troubleshoot and remove the failed physical host from the VCF system, for instance, which may be a time-consuming operation. In addition, detecting a change in physical hosts in the host pool and accordingly altering a suitable physical host corresponding to the cluster may be challenging.

Examples described herein may provide an SDDC manager in a hyperconverged infrastructure to provision one or more physical hosts to a cluster based on a dynamically generated manifest file. Example SDDC manager may dynamically generate the manifest file for the cluster. In one example, the manifest file may include metadata associated with the cluster. Further, the SDDC manager may determine the one or more physical hosts in a host pool that are compatible with the cluster using the manifest file. Furthermore, the SDDC manager may generate a cluster-to-physical host mapping table by mapping the cluster to the determined one or more physical hosts that are compatible with the cluster. Further, the SDDC manager may provision the one or more physical hosts to the cluster using the cluster-to-physical host mapping table in response to detecting a trigger. Thus, examples described herein may automatically determine a compatible physical host and provision the compatible physical host to the cluster in the hyperconverged infrastructure.

In the following description, for purposes of explanation, numerous specific details are set forth in order to provide a thorough understanding of the present techniques. However, the example apparatuses, devices and systems, may be practiced without these specific details. Reference in the specification to "an example" or similar language means that a feature, structure, or characteristic described is included in at least that one example but may not be in other examples.

Turning now to the figures, FIG. 1 is a block diagram of an example hyperconverged infrastructure 100, including an SDDC manager 102 to provision at least one of physical hosts 108A-108N to a cluster (e.g., 104A) based on a dynamically generated manifest file 112. Example hyperconverged infrastructure 100 may include multiple clusters 104A-104N and a management cluster 102 communicatively coupled to clusters 104A-104N via a network. Example clusters 104A-104N may be stretched clusters, multi-AZ clusters, metro clusters, or high availability (HA) clusters that may cross multiple areas within local area networks (LAN). Also, clusters 104A-104N may cross multiple areas via a wide area network (WAN). Each cluster (e.g., 104A-104N) can be a production cluster, a development cluster, or a test cluster. The terms "hyperconverged infrastructure" and "system" are used interchangeably throughout the document.

Furthermore, hyperconverged infrastructure 100 may include a host pool 106. Example host pool 106 may include a plurality of physical hosts 108A-108N. For example, physical hosts 108A-108N may be physical computing devices. Further, physical host computing devices can execute workloads such as virtual machines, applications, and the like.

Also, management cluster 102 may include SDDC manager 110. SDDC manager 110 may be communicatively connected to host pool 106 and clusters 104A-104N via the network. Example network may be a Wi-Fi, WiMAX, LAN, WAN, metropolitan area network, Internet network, fixed wireless network, a wireless LAN, wireless WAN, personal area network (PAN), virtual private network (VPN), intranet, SD-WAN, or the like. During operation, SDDC manager 110 may dynamically generate manifest file 112 for cluster (e.g., cluster 104A) in hyperconverged infrastructure 100. In one example, SDDC manager 110 may dynamically generate a manifest file for each cluster in a workload domain, when the workload domain is deployed in hyperconverged infrastructure 100. In another example, SDDC manager 110 may generate a manifest file for a cluster when the cluster is created in the workload domain.

In an example, manifest file 112 may be a blueprint of cluster 104A. Further, manifest file 112 may include metadata associated with cluster 104A. Example metadata may include cluster characteristics (e.g., hardware and software characteristics) such as a computer type, a storage type, a network type, an image type of physical hosts and associated patches, a service level agreement (SLA) type, physical network interface cards (NIC) type, vSAN information, and/or the like. Example storage type may include a model number, storage and model type, drive type, revolutions per minute (RPM), capacity, and the like. Example SLA type include gold, silver, and bronze types. Example NIC type may include a number of NICs, speed, and the like. Further, the cluster characteristics may also include any user defined characteristics of the cluster.

In one example, SDDC manager 110 may dynamically generate manifest file 112 for cluster 104A as and when cluster 104A is created, updated, or operational. Further, SDDC manager 110 may automatically maintain and update manifest file 112 upon any changes made to cluster 104A. For example, SDDC manager 110 may dynamically update manifest file 112 based on any inclusions, deletions, or changes made to policies associated with cluster 104A. Similarly, SDDC manager 110 may generate and update manifest files for other clusters 104B-104N.

Further, SDDC manager 110 may determine one or more physical hosts (e.g., 108A-108C) in host pool 106 that are compatible with cluster 104A using manifest file 112. In one example, SDDC manager 110 may compare manifest file 112 with each physical host 108A-108N in host pool 106. Further, SDDC manager 110 may determine one or more physical hosts 108A-108C that are compatible with cluster 104A based on the comparison.

Figures 2, 3:
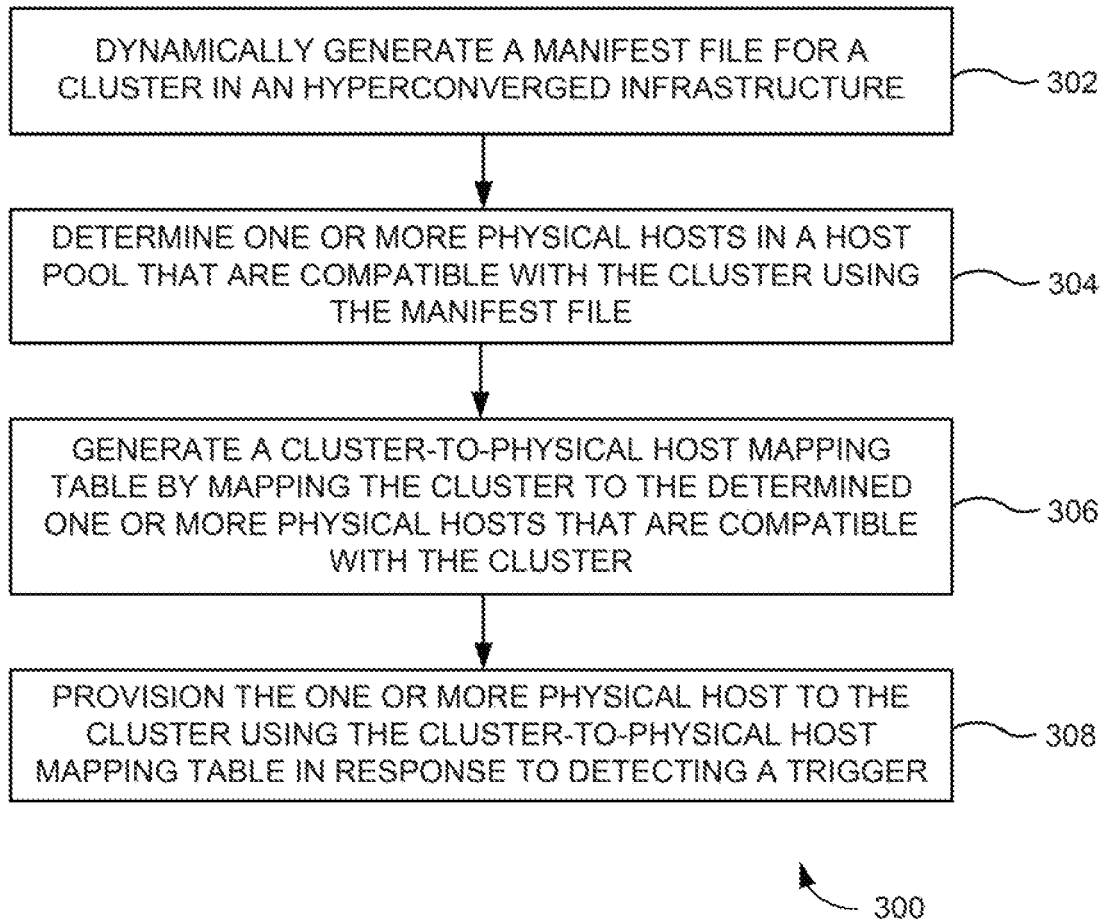
FIG. 2 depicts an example cluster-to-physical host (C2H) mapping table, according to an example embodiment.
FIG. 3 is a flowchart illustrating an example method for provisioning one or more physical hosts to a cluster based on a dynamically generated manifest file.

Further, management cluster 102 may include a cluster-to-physical host (C2H) mapping agent 114 to generate a cluster-to-physical host mapping table 116 by mapping cluster 104A to the determined one or more physical hosts 108A-108C that are compatible with cluster 104A. In one example, C2H mapping agent 114 may group one or more physical hosts 108A-108C, that are compatible with cluster 104A, in host pool 106 based on manifest file 112 associated with cluster 104A. Further, C2H mapping agent 114 may generate cluster-to-physical host mapping table 116 by mapping cluster 104A to grouped one or more physical hosts 108A-108C that are compatible with cluster 104A. In one example, C2H mapping agent 114 may dynamically update cluster-to-physical host mapping table 116 in response to detecting a change to cluster 104A, host pool 106, and/or the service level agreement compliance. Example cluster-to-physical host mapping table 116 is depicted in FIG. 2.

Further, SDDC manager 110 may provision one or more physical hosts 108A-108C to cluster 104A using cluster-to-physical host mapping table 116 in response to detecting a trigger. In one example, the trigger to provision one or more physical hosts 108A-108C may be generated in response to receiving a request to provision a physical host to cluster 104A.

In another example, the trigger may be generated upon the resource utilization of cluster 104A reaching one or more threshold limits. As shown in FIG. 1, management cluster 102 may include a resource aggregator 118 to periodically obtain resource utilization information from each cluster 104A-104N. In one example, resource utilization may refer to a central processing unit (CPU), memory and/or storage consumption/utilization. Also, resource utilization may refer to consumption/utilization at a system level, a site level, a rack level, a cluster and/or a physical host level in hyperconverged infrastructure 100.

SDDC manager 110 may identify, reserve, and prepare for provisioning one or more physical hosts 108A-108C to cluster 104A upon the obtained resource utilization of cluster 104A reaching the one or more threshold limits. Further, SDDC manager 110 may provision prepared one or more physical hosts 108A-108C to cluster 104A in hyperconverged infrastructure 100.

In an example, SDDC manager 110 may identify and reserve one or more physical hosts 108A-108C to cluster 104A upon the resource utilization of cluster 104A reaching a first threshold limit. Further, SDDC manager 110 may prepare the identified and reserved one or more physical hosts 108A-108C for provisioning upon the resource utilization of cluster 104A reaching a second threshold limit. The second threshold limit may be greater than the first threshold limit.

In one example, SDDC manager 110 may prepare one or more physical hosts 108A-108C based on imaging, networking, domain name system (DNS), network time protocol (NTP), physical network interface card (NIC) requirements, and affinity rules of cluster 104A upon the resource utilization of cluster 104A reaching the second threshold limit. In one example, SDDC manager 110 may image one or more physical hosts 108A-108C based on cluster 104A. Further, SDDC manager 110 may pre-configure one or more physical hosts 108A-108C based on the imaging, networking, domain name system (DNS), network time protocol (NTP), and physical network interface card (NIC) requirements of cluster 104A upon the resource utilization of cluster 104A reaching the second threshold limit.

In some examples, the functionalities described herein, in relation to instructions to implement functions of SDDC manager 110, C2H mapping agent 114, resource aggregator 118, and any additional instructions described herein in relation to the storage medium, may be implemented as engines or modules comprising any combination of hardware and programming to implement the functionalities of the modules or engines described herein. The functions of SDDC manager 110, C2H mapping agent 114, and resource aggregator 118 may also be implemented by a respective processor. In examples described herein, the processor may include, for example, one processor or multiple processors included in a single device or distributed across multiple devices.

FIG. 2 depicts example cluster-to-physical host (C2H) mapping table 116 of FIG. 1, according to an example embodiment. Example cluster-to-physical host mapping table 116 may be generated by mapping each cluster in a workload domain to respective compatible physical hosts in a host pool. In one example, SDDC manager (e.g., SDDC manager 110 of FIG. 1) may assign workload domain identifier (ID) 202 to each workload domain in a hyperconverged infrastructure (e.g., hyperconverged infrastructure 100 of FIG. 1), cluster ID 204 to each cluster (e.g., clusters 104A-104N of FIG. 1), physical host ID 206 to each physical host (e.g., physical host 108A-108N of FIG. 1) in host pool (e.g., host pool 106 of FIG. 1), and manifest ID 208 to each manifest file associated with each cluster 104A-104N.

In an example, a C2H mapping agent (e.g., C2H mapping agent 114 of FIG. 1) provides physical host(s) reserved per cluster and maintains a list of reserved physical hosts associated with each cluster 104A-104N in cluster-to-physical host mapping table 116. Thus, example cluster-to-physical host mapping table 116 may include information such as workload domain ID 202, cluster ID 204, physical host ID 206, and manifest file ID 208.

In one example, C2H mapping agent 114 may update cluster-to-physical host mapping table 116 when there is any change in physical host characteristics (e.g., NIC changes, vSAN disc changes, and the like) of physical host 108A-108N by running corresponding manifest files against physical hosts 108A-108N in host pool 106. Thus, the physical hosts may be selected based on the cluster type. In such examples, any dynamic changes in the physical hosts that are in the host pool may be identified and logic may be re-executed to find the best compatible physical hosts to the cluster.

Similarly, C2H mapping agent 114 may update cluster-to-physical host mapping table 116 when there is any change in characteristics and/or policies of clusters 104A-104N. In this example, SDDC manager 110 may keep manifest file 112 up to date with respect to cluster 104A. Whenever administrator provisions, changes, and/or deletes any policies in cluster 104A, the updates may be reflected to manifest file 112 dynamically through SDDC manager 110. SDDC manager 110 may keep manifest file 112 identical to cluster 104A. Accordingly cluster-to-physical host mapping table 116 may be updated.

FIG. 3 is a flowchart illustrating an example method 300 for provisioning one or more physical hosts to a cluster based on a dynamically generated manifest file. The process depicted in FIG. 3 may represent generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 302, the manifest file may be dynamically generated for a cluster in an hyperconverged infrastructure. In one example, the manifest file may include metadata associated with the cluster. Example metadata may include cluster characteristics such as a computer type, a storage type, a network type, an image type of physical hosts and associated patches, and/or a service level agreement (SLA) type.

At 304, one or more physical hosts in a host pool that are compatible with the cluster may be determined using the manifest file. In one example, determining the one or more physical hosts that are compatible with the cluster may include comparing the manifest file with each physical host in the host pool and determining the one or more physical hosts that are compatible with the cluster based on the comparison.

At 306, a cluster-to-physical host mapping table may be generated by mapping the cluster to the determined one or more physical hosts that are compatible with the cluster. In one example, generating the cluster-to-physical host mapping table may include grouping the one or more physical hosts, that are compatible with the cluster, in the host pool based on the manifest file associated with the cluster and generating the cluster-to-physical host mapping table by mapping the cluster to the grouped one or more physical hosts that are compatible with the cluster. Further, generating the cluster-to-physical host mapping table may include generating the cluster-to-physical host mapping table by further mapping the cluster to priority data present in a corresponding service level agreement compliance. In one example, the cluster-to-physical host mapping table may be dynamically updated upon any changes to the cluster, the host pool, and/or the service level agreement compliance.

At 308, the one or more physical hosts may be provisioned to the cluster using the cluster-to-physical host mapping table in response to detecting a trigger. In an example, the trigger to provision the one or more physical hosts may be generated in response to receiving a request to provision the physical host to the cluster. In other examples, the trigger may be generated upon the resource utilization of the cluster reaching one or more threshold limits. In this example, provisioning the one or more physical hosts to the cluster may include identifying, reserving, and preparing for provisioning the one or more physical hosts to the cluster upon a resource utilization of the cluster reaching the one or more threshold limits. Further, the prepared one or more physical hosts may be provisioned to the cluster in the hyperconverged infrastructure.

In the above example, identifying, reserving, and preparing the one or more physical hosts may include identifying and reserving the one or more physical hosts to the cluster upon the resource utilization of the cluster reaching a first threshold limit and preparing the identified and reserved one or more physical hosts for provisioning upon the resource utilization of the cluster reaching a second threshold limit. The first threshold limit and the second threshold limit for each cluster in the hyperconverged infrastructure are user defined or determined based on artificial intelligence and machine learning techniques.

For example, the user may define the first threshold limit and the second threshold limit for the cluster based on resource utilization. Example user may be an information technology (IT) administrator. Example first threshold limit may be in the range of 60% to 70% of resource utilization and example second threshold limit may be in the range of 80% to 90% of resource utilization. In some examples, the user may define the first threshold limit based on cluster priority and/or historical data. For example, when a cluster has a higher priority (e.g., priority "gold" may refer to guaranteed resource addition on-demand and priority "silver" may refer to resource addition guaranteed within a predetermined time (example 48 hours)), then the user may choose the first threshold limit of about 60%.

In one example, preparing the identified and reserved one or more physical hosts for provisioning upon the resource utilization of the cluster reaching the second threshold limit may include preparing the one or more physical hosts based on imaging, networking, domain name system (DNS), network time protocol (NTP), physical network interface card (NIC) requirements, and affinity rules of the cluster upon the resource utilization of the cluster reaching the second threshold limit. In one example, imaging the one or more physical hosts may include imaging the one or more physical hosts based on the cluster. Further, preparing the identified and reserved one or more physical hosts for provisioning may include pre-configuring the one or more physical hosts based on the imaging, networking, domain name system (DNS), network time protocol (NTP), and physical network interface card (NIC) requirements of the cluster upon the resource utilization of the cluster reaching the second threshold limit.

In one example, preparing the identified and reserved one or more physical hosts may be an advance preparation activity before dynamically provisioning identified and reserved one or more physical hosts to the cluster. Preparation may also include image and path installation based on the cluster.

Thus, examples described herein may provide knowledge based physical host selection method for clusters in a hyperconverged infrastructure. For example, examples described herein may identify a suitable or compatible physical host from a host pool for provisioning to a cluster.

Also, examples described herein may provide recommendation to the cluster about the best possible physical host in advance through a cluster-to-physical host mapping table. Further, examples described herein may notify the user when there is no compatible physical host available to the existing cluster.

Figure 4:
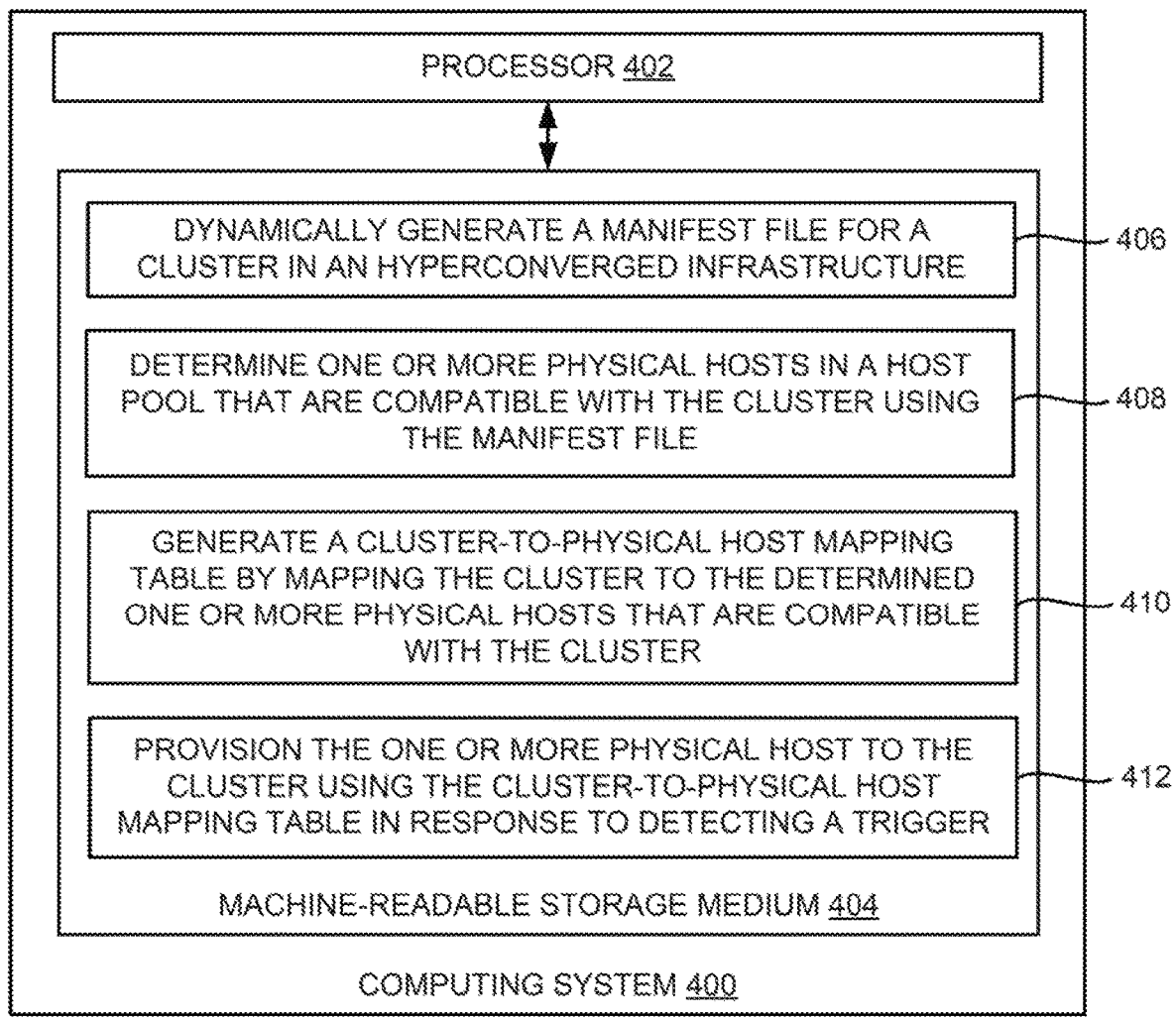
FIG. 4 is a block diagram of an example computing system including a non-transitory computer-readable storage medium, storing instructions to provision one or more physical hosts to a cluster based on a dynamically generated manifest file.

FIG. 4 is a block diagram of an example computing system 400 including a non-transitory computer-readable storage medium 404, storing instructions to provision one or more physical hosts to a cluster based on a dynamically generated manifest file. Computing system 400 may include a processor 402 and machine-readable storage medium 404 communicatively coupled through a system bus. Processor 402 may be any type of central processing unit (CPU), microprocessor, or processing logic that interprets and executes machine-readable instructions stored in the machine-readable storage medium 404. Machine-readable storage medium 404 may be a random-access memory (RAM) or another type of dynamic storage device that may store information and machine-readable instructions that may be executed by processor 402. For example, machine-readable storage medium 404 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 404 may be a non-transitory machine-readable medium. In an example, machine-readable storage medium 404 may be remote but accessible to computing system 400.

Machine-readable storage medium 404 may store instructions 406-412. In an example, instructions 406-412 may be executed by processor 402 to provision the one or more physical hosts to the cluster based on the dynamically generated manifest file in the hyperconverged infrastructure. Instructions 406 may be executed by processor 402 to dynamically generate the manifest file for the cluster in the hyperconverged infrastructure. In one example, the manifest file may include metadata associated with the cluster. Instructions 408 may be executed by processor 402 to determine one or more physical hosts in a host pool that are compatible with the cluster using the manifest file. Instructions 410 may be executed by processor 402 to generate a cluster-to-physical host mapping table by mapping the cluster to the determined one or more physical hosts that are compatible with the cluster. Further, instructions 412 may be executed by processor 402 to provision the one or more physical hosts to the cluster using the cluster-to-physical host mapping table in response to detecting a trigger.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A computer implemented method comprising:
dynamically generating a manifest file for a cluster in an hyperconverged infrastructure, wherein the manifest file comprises metadata associated with the cluster;
comparing the manifest file with each physical host in a host pool;
determining one or more physical hosts in the host pool that are compatible with the cluster based on the comparison;
generating a cluster-to-physical host mapping table by mapping the cluster to the determined one or more physical hosts that are compatible with the cluster; and
provisioning the one or more physical hosts to the cluster using the cluster-to-physical host mapping table in response to receiving a request to provision the physical host to the cluster or resource utilization of the cluster reaching one or more threshold limits.

2. The computer implemented method of claim 1, wherein the metadata comprises cluster characteristics, and wherein the cluster characteristics are a computer type, a storage type, a network type, an image type of physical hosts and associated patches, a network interface cards (NIC) type, and/or a service level agreement (SLA) type.

3. The computer implemented method of claim 1, wherein generating the cluster-to-physical host mapping table comprises:
grouping the one or more physical hosts, that are compatible with the cluster, in the host pool based on the manifest file associated with the cluster; and
generating the cluster-to-physical host mapping table by mapping the cluster to the grouped one or more physical hosts that are compatible with the cluster.

4. The computer implemented method of claim 1, wherein generating the cluster-to-physical host mapping table further comprises:
   generating the cluster-to-physical host mapping table by further mapping the cluster to priority data present in a corresponding service level agreement compliance.

5. The computer implemented method of claim 4, further comprising:
   dynamically updating the cluster-to-physical host mapping table in response to detecting a change to the cluster, the host pool, and/or the service level agreement compliance.

6. The computer implemented method of claim 1, wherein provisioning the one or more physical hosts to the cluster comprises:
   identifying, reserving, and preparing for provisioning the one or more physical hosts to the cluster upon the resource utilization of the cluster reaching the one or more threshold limits; and
   provisioning the prepared one or more physical hosts to the cluster in the hyperconverged infrastructure.

7. The computer implemented method of claim 6, wherein identifying, reserving, and preparing the one or more physical hosts comprises:
   identifying and reserving the one or more physical hosts to the cluster upon the resource utilization of the cluster reaching a first threshold limit; and
   preparing the identified and reserved one or more physical hosts for provisioning upon the resource utilization of the cluster reaching a second threshold limit.

8. The computer implemented method of claim 7, wherein the first threshold limit and the second threshold limit for each cluster in the hyperconverged infrastructure are user defined or determined based on artificial intelligence and machine learning techniques.

9. The computer implemented method of claim 7, wherein preparing the identified and reserved one or more physical hosts for provisioning upon the resource utilization of the cluster reaching the second threshold limit comprises:
   preparing the one or more physical hosts based on imaging, networking, domain name system (DNS), network time protocol (NTP), physical network interface card (NIC) requirements, and affinity rules of the cluster upon the resource utilization of the cluster reaching the second threshold limit, and wherein imaging the one or more physical hosts comprises imaging the one or more physical hosts based on the cluster; and
   pre-configuring the one or more physical hosts based on the imaging, networking, domain name system (DNS), network time protocol (NTP), and physical network interface card (NIC) requirements of the cluster upon the resource utilization of the cluster reaching the second threshold limit.

10. A system comprising:
    a cluster;
    a host pool including a plurality of physical hosts; and
    a management cluster communicatively coupled to the cluster and the host pool via internet, wherein the management cluster comprises:
       a software-defined data center (SDDC) manager to:
          dynamically generate a manifest file for the cluster in an hyperconverged infrastructure, wherein the manifest file comprises metadata associated with the cluster;
          compare the manifest file with each physical host in the host pool; and
          determine one or more physical hosts in the host pool that are compatible with the cluster based on the comparison; and
       a cluster-to-physical host mapping agent to generate a cluster-to-physical host mapping table by mapping the cluster to the determined one or more physical hosts that are compatible with the cluster, wherein the SDDC manager is to provision the one or more physical hosts to the cluster using the cluster-to-physical host mapping table in response to resource utilization of the cluster reaching one or more threshold limits.

11. The system of claim 10, wherein the SDDC manager is to group the one or more physical hosts, that are compatible with the cluster, in the host pool based on the manifest file associated with the cluster, and wherein the cluster-to-physical host mapping agent is to generate the cluster-to-physical host mapping table by mapping the cluster to the grouped one or more physical hosts that are compatible with the cluster.

12. The system of claim 10, wherein the cluster-to-physical host mapping agent is to:
    generate the cluster-to-physical host mapping table by further mapping the cluster to priority data present in a corresponding service level agreement compliance.

13. The system of claim 12, wherein the cluster-to-physical host mapping agent is to:
    dynamically update the cluster-to-physical host mapping table in response to detecting a change to the cluster, the host pool, and/or the service level agreement compliance.

14. The system of claim 10, wherein the SDDC manager is to:
    identify, reserve, and prepare for provisioning the one or more physical hosts to the cluster upon the resource utilization of the cluster reaching the one or more threshold limits; and
    provision the prepared one or more physical hosts to the cluster in the hyperconverged infrastructure.

15. The system of claim 10, wherein the SDDC manager is to:
    identify and reserve the one or more physical hosts to the cluster upon the resource utilization of the cluster reaching a first threshold limit; and
    prepare the identified and reserved one or more physical hosts for provisioning upon the resource utilization of the cluster reaching a second threshold limit.

16. A non-transitory machine-readable storage medium encoded with instructions that, when executed by a processor cause the processor to:
    dynamically generate a manifest file for a cluster in an hyperconverged infrastructure, wherein the manifest file comprises metadata associated with the cluster;
    compare the manifest file with each physical host in a host pool;
    determine one or more physical hosts in the host pool that are compatible with the cluster based on the comparison;
    generate a cluster-to-physical host mapping table by mapping the cluster to the determined one or more physical hosts that are compatible with the cluster; and
    provision the one or more physical hosts to the cluster using the cluster-to-physical host mapping table in response to receiving a request to provision the physical host to the cluster or detecting that resource utilization of the cluster reaching a threshold limit.

17. The non-transitory machine-readable storage medium of claim 16, wherein the instructions to generate the cluster-to-physical host mapping table comprise instructions to:
  group the one or more physical hosts, that are compatible with the cluster, in the host pool based on the manifest file associated with the cluster; and
  generate the cluster-to-physical host mapping table by mapping the cluster to the grouped one or more physical hosts that are compatible with the cluster.

18. The non-transitory machine-readable storage medium of claim 16, further comprising instructions to:
  dynamically update the cluster-to-physical host mapping table in response to detecting a change to the cluster, the host pool, and/or the service level agreement compliance.

* * * * *